United States Patent Office 3,334,366
Patented Aug. 8, 1967

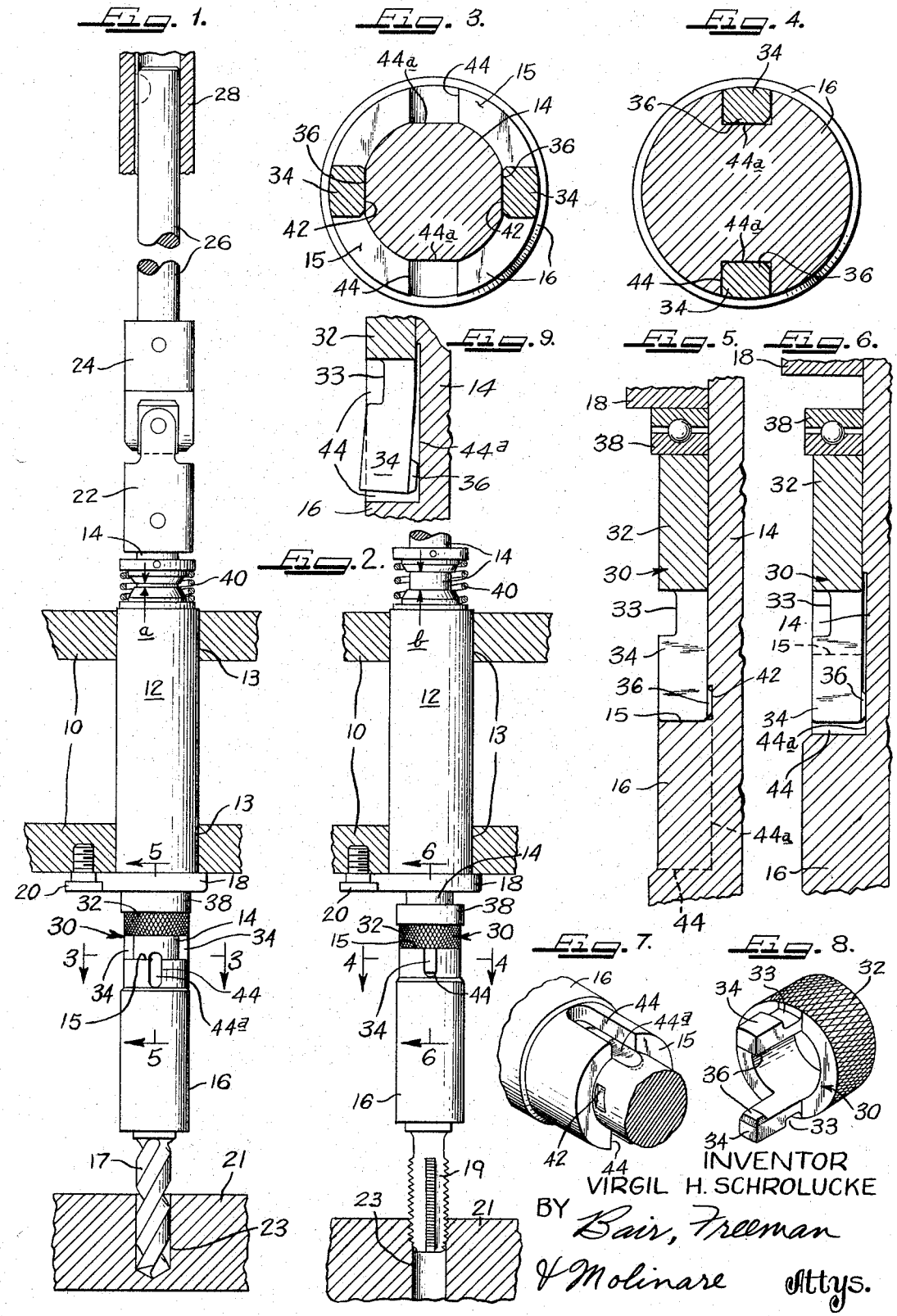

3,334,366
COMBINATION DRILLING AND TAPPING SPINDLE
Virgil H. Schrolucke, Richmond, Ind., assignor to National Automatic Tool Company, Inc., a corporation of Indiana
Filed July 19, 1965, Ser. No. 473,063
10 Claims. (Cl. 10—129)

This invention relates to a combination drilling and tapping spindle for machine tools and the like.

One object of the invention is to provide such a combination spindle which has a solid thrust connection for drilling operations and a freely floating connection for tapping operations whereby (1) positive feed for a drill into the work and (2) free axial movement of a tap into the drilled hole due to its inherent lead screw action are had.

Another object is to provide a combination spindle which may be quickly adjusted in a simple manner for either drilling or tapping operations as desired.

Still another object is to provide a spindle with which a special spacer sleeve coacts, the sleeve being adjustable to provide either a solid thrust connection or an axial floating connection by rotatably adjusting the sleeve to either of two different positions relative to the spindle.

More particularly it is an object of the invention to provide a comparatively simple and inexpensive spacer sleeve comprising a collar and a pair of fingers thereon which act as a spacer between a thrust bearing and a spindle in one position of the spacer sleeve, and in another position axial movement is permitted by reason of the fingers being received in slots of the spindle, the fingers thereupon being axially slidable in the slots.

A further object is to provide the fingers of spring material having their lower ends normally coacting with depressions in the surface of the spindle shaft in that position in which the spacer sleeve acts as a solid thrust connection between a thrust bearing of the machine tool and the spindle, the projections having cam-like coaction with the depressions in the surface of the spindle shaft upon rotation to another position to cause the projections to climb out of the depressions whereupon the fingers in the latter position may enter the slots of the spindle and thereafter the slots may move axially relative to the fingers under the lead screw action of the tap as it enters a drilled hole in the work.

Still a further object is to provide expansible means on the spindle tending to retain the parts in tapping position, the depressions in the surface of the spindle shaft coacting cam-like with the projections of the spring fingers to normally retain the spacer sleeve in drilling position but the sleeve being capable of being forcibly rotated from drilling position which causes the fingers to climb out of the depressions whereupon rotation of the spacer sleeve can be continued to tapping position.

An additional object is to provide the expansible means readily compressible by pulling downwardly on the spindle whereupon the spacer sleeve may be manually positioned so that it can be rotated from tapping position to drilling position.

Another additional object is to provide a modified version of my invention in which the spring fingers of the spacer sleeve, when in the slots of the spindle, frictionally engage the bottoms of the slots so as to resiliently resist axial movement of the tap relative to the spindle during tapping operations.

With these and other objects in view, my invention consists in the construction, arrangement and combination of the various parts of my combination drilling and tapping spindle, whereby the objects above contemplated are attained, as hereinafter more fully set forth, pointed out in my claims and illustrated in detail on the accompanying drawing, wherein:

FIG. 1 is a side elevation of a combination spindle embodying my invention and illustrating it during a drilling operation, associated parts of a spindle box and a drive sleeve being shown in cross section;

FIG. 2 is a similar view showing a different position of the parts and the action during tapping;

FIGS. 3 and 4 are enlarged horizontal sectional views on the lines 3—3 and 4—4 of FIGS. 1 and 2, respectively, showing details of construction and differences of coaction between parts during drilling and tapping operations;

FIGS. 5 and 6 are enlarged vertical sectional views on the lines 5—5 and 6—6, respectively, of FIGS. 1 and 2 also showing differences of coaction between parts during drilling and tapping operations;

FIG. 7 is a perspective view of a portion of a spindle;

FIG. 8 is a perspective view of a spacer collar for coaction therewith, and

FIG. 9 is a view similar to a portion of FIG. 6 showing a modification.

On the accompanying drawing I have used the reference numeral 10 to indicate a "slip plate" of a spindle box of a machine tool such as one of the general type shown in Schafer Patent No. 2,405,718. These slip plates are usually in the form of a hollow casting and as such the one shown on the drawing is illustrated as vertically spaced top and bottom walls. A spindle sleeve 12 is shown which is of the quick detachable type, being provided with a flange 18 with which a clamp screw 20 coacts to secure the spindle sleeve in a bore 13 of the slip plate 10. The spindle sleeve 12 is provided with suitable bearings in which a spindle rotates. The spindle comprises a shaft 14, and an enlarged portion 16 which serves as a tool-receiving head. The head 16 may directly receive a tool such as a drill 17 (FIG. 1), or a suitable chuck to hold and drive the drill. As shown in FIG. 2 the spindle head 16 may alternatively hold and drive a tap 19. The spindle 14, 16 has a shoulder 15 at the upper end of the head 16.

The usual means for driving the spindle shaft 14 is a universal joint 22, 24, a drive shaft 26, and a drive sleeve 28 which telescopes over the shaft 26. These are suitably mounted in the spindle box of the machine tool in the manner illustrated in the Schafer patent.

My combination drilling and tapping splindle includes a spacer sleeve 30 of novel construction comprising a knurled collar 32 and a pair of fingers 34 extending downwardly from the collar. The collar and fingers form a solid thrust connection between a thrust bearing 38 and the shoulder 15 of the spindle head 16 in the drilling operation as will hereinafter appear. The fingers 34 are provided with inwardly directed projections 36. Coacting with the projections 36 at times are depressions 42 in opposite sides of the spindle shaft 14 in the form of "flats" as illustrated in FIG. 3. The diametrical distance from flat to flat is substantially the same as the distance between the projections 36. The spindle head 16 is provided with a pair of opposite finger-receiving slots 44 for at other times receiving the fingers 34. The slots 44 may be milled in the upper marginal end of the head 16 as shown in FIG. 7 with the distance from bottom surface to bottom surface also substantially the same as the distance between the projections 36.

Referring to FIGS. 1 and 2, a play take-up spring 40 is provided which as shown in FIG. 1, tends to keep the assembly of drill 17, spindle head 16 and spindle shaft 14 elevated so that the lower ends of the fingers 34 contact the shoulder 15 of the head 16, the upper surface of the collar 32 contacts the thrust bearing 38 and the upper surface of the thrust bearing contacts the flange 18. A dimension a is shown in FIG. 1 to indicate slight spacing between a pair of spring seat washers when the spacer sleeve 30 is adjusted for drilling. The force of the spring 40 is designed to exceed the weight of the spindle 12, 14, the head 16 and the tool carried thereby in addition to any chuck that might be interposed between the head and the tool, plus the weight of the spindle drive components 22, 24 and 26.

During the drilling operation, the projections 36 are seated in the depressions or flats 42 as shown in FIGS. 1, 3 and 5. The spacer sleeve 30 is made of steel or the like and, accordingly, there is inherent spring to the fingers 34. They may be thinned down radially by means of notches 33 as shown in FIGS. 5, 6 and 8 to attain a desired degree of resilience. The collar 32 can be rotated in either direction from the position shown to cause the projections 36 to, cam-like, climb out of the flat areas 42 and frictionally ride on the surface of the spindle shaft 14. In the case of spindles 16 an inch or so in outside diameter I have found approximately four pounds a suitable value for the tangential force to rotate the collar between the FIG. 3 position and the FIG. 4 position. The fingers may now be rotated to the position of FIGS. 2 and 4 whereupon they are aligned with the slots 44.

At this time the play take-up spring 40, due to its tendency to expand, will raise the spindle 14, 16 as shown in FIG. 2 which action causes the fingers 34 to enter the slots 44. The spring 40 will hold the spacer sleeve 30 up and the thrust bearing 38 against the flange 18 prior to entry of the tap 19 into the drilled hole 23 of the work 21 (prior to the FIG. 2 position). The tap is first forced to enter the hole by downward feed of the slip plate 10 at a rate slightly less than the lead screw rate of the tap.

Accordingly, the initial feeding force starts the tap in the hole and as the tap takes hold and the tapping operation proceeds, the tap, due to its inherent lead screw action, automatically feeds itself faster than the feed of the slip plate. This is illustrated in FIG. 2 wherein the thrust bearing 38 has "walked" away from the flange 18. Thus, after the tap is started and takes hold, it will be free to move axially due to its lead screw action as distinguished from a solid thrust connection as shown in FIG. 1 during the drilling operation in the work which formed the drill hole 23 therein, and likewise a solid trust connection at the start only of the tapping operation. By having the feed rate of the slip plate less than the result of tap lead and rotation, the tap is free to "float" along on its own lead.

A combination drilling and tapping spindle of the kind disclosed operating as described is particularly desirable in a multiple spindle drilling and tapping machine where some holes may be drilled simultaneously at the time others are being tapped. Each tap will take care of itself, as far as pulling ahead of the slip plate and feed into the work are concerned, while the drills are positively moved forward at less rate than the lead screw rate of the taps, the speed of rotation and the feeding rate being, of course, properly coordinated.

When it is desirable to change the spacer sleeve 30 from the tapping position of FIG. 2 to the drilling position of FIG. 1, the spindle head 16 is grasped and pulled downwardly against the bias of the spring 40 while holding the sleeve against the thrust bearing 38 until the space a in FIG. 1 is taken up whereupon the projections 34 are withdrawn from the slots 44. The shoulder 15 of the head 16 is now spaced this same distance a from the lower ends of the fingers 34 and the knurled collar 32 may then be rotated back to the position shown in FIGS. 1 and 3 with the projections 32 seated in the flats 42. Such seating subsequently prevents the spacer sleeve 30 from accidentally vibrating out of drilling position during drilling operations.

Thus far I have described a free floating connection between the spindle and the machine tool during tapping operations. In some instances a resilient friction connection may be desirable, especially in certain tap sizes and/or machine tool component sizes. This can be readily accomplished by making the projections 36 higher so that the fingers 34 will be sprung as shown in FIG. 9 and thus under bending tension which produces friction instead of unsprung as shown in FIG. 6 which permits free floating action. In the case of such modification the depressions 42 would be correspondingly deeper.

From the foregoing specification it will be obvious that I have provided a comparatively simple spacer sleeve 30 operable to provide a solid thrust connection for drilling operations and a free floating connection for tapping operations. The spacer sleeve is in the form of a knurled collar 32 which may readily be manually rotated from either position to the other when changing from drills to taps or from taps to drills. If desired, frictional engagement of the projections 36 with the bottoms of the slots 44 may be provided to resiliently resist relative axial movement of the parts during the tapping operation. Both the free floating and the frictional resistance types of connection minimize breakage of taps and provide efficient, quickly operable tapping connections as between a self-advanced tap and a drive spindle for the tap.

Some changes may be made in the construction and arrangement of the parts of my combination drilling and tapping spindle without departing from the real spirit and purpose of my invention, and it is my intention to cover by my claims any modified forms of structure or use of mechanical equivalents which may reasonably be included within their scope.

I claim as my invention:

1. In a combination drilling and tapping spindle, means for providing a solid thrust connection for drilling and a floating connection for tapping comprising a spacer sleeve on said spindle and adapted to provide a solid thrust connection between a machine tool and said spindle, said spacer sleeve having a collar and a finger projecting from said collar toward and contacting a shoulder of said spindle in one position of rotation of said spacer sleeve relative to said spindle, said spindle having a slot beyond said shoulder to receive said finger in another position of rotation of said spacer sleeve relative to said spindle which permits axial floating of said finger in said slot.

2. A combination drilling and tapping spindle according to claim 1 wherein said spindle includes a spindle shaft, said finger has a projection toward the surface of said spindle shaft and said spindle shaft has a depression in said surface to receive said projection in said one position of said spacer sleeve.

3. A combination drilling and tapping spindle according to claim 2 wherein said projections have cam-like coaction with said depression to cause said finger to climb out of said depression upon rotation of said spacer sleeve from said first position to said second position.

4. A combination drilling and tapping spindle according to claim 1 wherein said spindle includes a shaft, and said finger is a spring finger adapted to frictionally engage the surface of said spindle shaft as said spacer sleeve is rotated from said first position.

5. A combination drilling and tapping spindle according to claim 1 wherein said spacer sleeve is provided with a pair of said fingers, and said spindle has a pair of said depressions and a pair of said slots, said fingers, said depressions and said slots of each pair being diametrically opposite each other.

6. A combination drilling and tapping spindle according to claim 5 wherein said projections have cam-like coaction with said depressions to spring said fingers out of said depressions upon rotation of said spacer sleeve from said first position to said second position.

7. A combination drilling and tapping spindle according to claim 1 wherein expansible means is provided which tends to pull said shoulder of said spindle toward the machine tool to keep said spacer sleeve in said one solid thrust connection position and to enter said finger into said slot in said another axial floating position.

8. A combination drilling and tapping spindle according to claim 5 wherein expansible means is provided to pull said shoulder of said spindle toward the machine tool to keep said spacer sleeve in said one position and to enter said fingers into said slots in said another position.

9. A combination drilling and tapping spindle according to claim 4 wherein said finger also frictionally engages the bottom of said slot when said spacer sleeve is in said second position whereby a resilient frictional drive connection is provided for said spindle during a tapping operation.

10. A combination drilling and tapping spindle according to claim 5 wherein said spindle includes a shaft, said fingers are spring fingers adapted to frictionally engage the surface of said spindle shaft as said spacer sleeve is rotated from said first position and said fingers also frictionally engage the bottoms of said slots when said spacer sleeve is in said second position.

References Cited

UNITED STATES PATENTS 3,179,965   4/1965   Khachigian _____ 10—129

FRANCIS S. HUSAR, *Primary Examiner.*